United States Patent [19]
Hengesbach

[11] 3,795,220
[45] Mar. 5, 1974

[54] LIQUID BALLASTED TEMPORARY TRAFFIC MARKER

[76] Inventor: Robert W. Hengesbach, 7886 Munson Rd., Mentor, Ohio 44060

[22] Filed: Apr. 12, 1972

[21] Appl. No.: 243,391

[52] U.S. Cl............................ 116/63 P, 40/125 N
[51] Int. Cl...................................................... E01f
[58] Field of Search............ 116/63, 63 P; 220/69; 248/346; 40/125 H, 125 J, 125 N; 240/1.2

[56] References Cited
UNITED STATES PATENTS

| | | | |
|---|---|---|---|
| 2,219,974 | 10/1940 | Bellow | 220/69 |
| 2,561,016 | 7/1951 | Ford et al. | 40/125 N |
| 2,762,327 | 9/1956 | Weig | 116/63 P |
| 2,806,131 | 9/1957 | Palmer | 240/1.2 |
| 2,957,444 | 10/1960 | Boettler | 116/63 P |
| 3,099,244 | 7/1963 | Knapp | 116/63 P |
| 3,113,551 | 12/1963 | Korn | 116/63 P |
| 3,132,624 | 5/1964 | Shoemaker, Jr. | 116/63 P |
| 3,380,428 | 4/1968 | Abrams | 116/63 P |
| 3,451,368 | 6/1969 | Keats | 116/63 P |

FOREIGN PATENTS OR APPLICATIONS

| | | | |
|---|---|---|---|
| 1,375,270 | 9/1964 | France | 116/63 P |

*Primary Examiner*—Louis J. Capozi
*Attorney, Agent, or Firm*—John Harrow Leonard

[57] ABSTRACT

An open bottom light weight indicator shell of easily deformable material is elastically supported on a bag of tough, imperforate, impervious, relatively limp or readily flexible material. The bag is fluid tight and partially filled with a quantity of anti-freeze liquid ballast. When the ballasted bag rests on a supporting surface, the bottom of the bag conforms to contour thereof yet supports the indicator shell in generally upright position and returns the shell to upright position if the shell is deflected by extraneous forces. The bag is readily completely collapsible and so large relative to the indicator that, when less than two thirds filled, it supports the indicator properly. The excess capacity can accommodate the surging liquid ballast displaced from portions of the bag run over and collapsed temporarily by a vehicle wheel. The bag retains the ballast so that it returns to the portion from which displaced and restores the bag and marker to the original functioning condition. Due to the low profile and collapsibility, the bag does not interpose appreciable frontal resistance to the passage of a vehicle wheel thereover. The shell is hollow and light and has translucent walls. A small electric bulb, flash button, and pen type dry batteries are mounted in the shell for illumination. They are of such limited size that they cannot be a hazard if struck by a passing vehicle.

12 Claims, 11 Drawing Figures

PATENTED MAR 5 1974　　3,795,220

LIQUID BALLASTED TEMPORARY TRAFFIC MARKER

BACKGROUND OF INVENTION

1. Field of Invention

Highway traffic signals and indicators.

2. Description of Prior Art

Temporary traffic markers of the readily placeable and removable type employing liquid or particulate matter as a ballast are known in the art. U.S. Pat. No. 2,806,131 to S. L. Palmer, issued Sept. 10, 1957 discloses a runway emergency marker for airports including an emergency light, a dome, and a battery mounted fixedly in the neck of a bag of flexible fabric material which is adapted to be filled with gravel, sand, crushed ice, snow, or loose weights. In operating position, the battery rests on and is supported in upright position by the ballast material. The patent mentions that the bottom of the bag will tend to conform to the terrain but a circular base of stiff material is provided on the bottom because the marker is to be used on relatively level runways, and so there is no necessity for the bottom of the bag to conform the contour of the supporting surface. This marker would be inoperable with a liquid ballast, inasmuch as the ballast itself must have sufficient rigidity to support and retain in the selected location the weight of the relative large and high profile storage battery and light. The marker, when charged with ballast, presents a relatively high profile of heavy collapse resistant ballast material and a superstructure of substantial size and weight. It would present a distinct hazard if struck by a vehicle wheel.

Patent No. 3,009,244 of R. S. Knapp, issued July 30, 1963, discloses a support for a conical indicator detachably supported in an annular base of relatively rigid material. The base is provided with feet so that it can accommodate itself somewhat to irregularities in the surface on which it is supported. It has a filling opening for the introduction of ballast material, such as sand, water, or any inexpensive relatively heavy material.

U.S. Pat. No. 2,347,823 of F. Buck et al., issued Apr. 26, 1966, discloses a traffic marker in the form of a flexible cone having an integral open top base into which water or loose material can be poured for greater stability. The marker, if filled with liquid ballast, would be operable only when supported on a substantially horizontal surface. If tilted temporarily, or run over, the ballast, if liquid, would be spilled. If filled with solid loose material the base would present a traffic hazard.

U.S. Pat. No. 3,380,428 to K. A. Abrams of Apr. 30, 1968 discloses a traffic guide post which is supported by a rigid annular container filled with water or other liquid. The base is rigid and is designed to cause a vehicle wheel to ride up over it.

U.S. Pat. No. 3,451,368 of J. B. Keats, issued June 24, 1969, also discloses an annular base which can be filled with solid particles or water and which detachably supports a marker in the form of a flexible cone. The patent recites that the base may be constructed of thermoplastic or rubbery material, or a more rigid thermoplastic, such as impact polystyrene etc. The relation of the base to the indicator is such that the base must be filled with ballast to function properly.

Outside the field of traffic markers, U.S. Pat. No. 2,219,974, to E. A. Bellow, issued Oct. 29, 1940, discloses a flexible bag partially filled with shot ballast and supporting an ashtray, the bag being such that it can be placed on a chair arm or other non-planar surface and can conform to the shape of the supporting surface, while the ashtray remains upright. The bag is said to be of any suitable soft and flexible material, such as soft leather, India rubber, or textile material. The ashtray, of course, is of a relatively rigid material and relatively large in proportion to the flexible bag.

Other prior art discloses various types of temporary markers which are filled with loose material and, in some instances, with liquid ballast. However, either they have relatively rigid bases or high profiles. Those ballasted with water are either open and spill easily, or are closed and sealed. If open, they are not reliable because if struck or tilted all or part of the liquid is lost and they become light and unstable, and inadequate to remain in their placed positions. Their bases are of such size relative to the indicators that they must be filled to provide stability. If they are closed, they are substantially solid, presenting a high profile and considerable weight of fixed size so that they are hazardous to vehicular traffic, the same as though filled with solid material.

SUMMARY OF THE INVENTION

The present marker is one in which a liquid ballasted base is readily deformable to the point of complete collapse at any portion run over by a vehicle wheel, but is of such size and capacity relative to the size and weight of the indicator that when only partially filled it is adequate to support the indicator, maintain it upright, return it to upright position if run over or deflected, and yet present an extremely low profile and remain adequately ballasted for its intended purpose. The base is selected so that its extra unfilled capacity provides a surge tank or receiving portion which can readily accommodate the ballast displaced by a vehicle wheel running over another portion. As a result, the base has a low profile and presents no substantial hazard to an oncoming vehicle. If run over it collapses completely and conforms to the pavement surface so that the wheel of the vehicle does not have to rise appreciably above the level of the pavement to pass over the base. The liquid content is not spilled, but returns to its original relation to the base and thereby concurrently restores the base and indicator to their proper operating positions. If, by any chance, the marker is caught and thrown against the vehicle, the extra capacity of the bag allows the bag and water to conform to, or flow around, the body surface portion that it strikes, and thus distributes the impact over a larger area and consequently with little likelihood of damage to the vehicle or to the marker. There are no heavy rigid parts which can be thrown forcibly by the vehicle wheel with danger to the vehicle by which it is struck or to vehicles passing alongside or following it. The base is sufficiently flexible, and is so related to the indicator, that the bottom of the base can conform to the surface on which the base rests while at the same time supporting the indicator in the proper upright position. The marker is economical to manufacture and can be emptied for storage and refilled for reuse readily. It is highly resistant to destruction by impacts to which it is likely to be subjected in use. It requires little storage space. In storage, a number of the devices with their flexible bases attached can be substantially nested to reduce storage requirements.

Various other objects and advantages will become apparent from the following description wherein reference is made to the drawing.

DESCRIPTION OF THE PREFERRED EMBODIMENTS OF THE INVENTION

Figure 1:
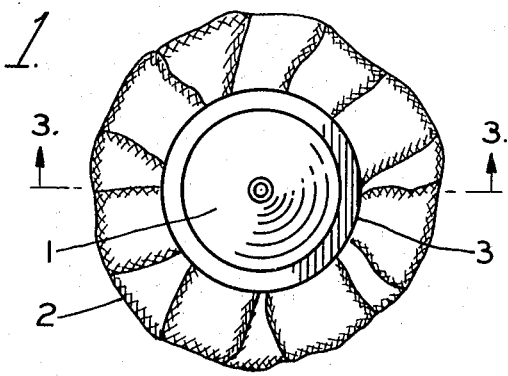
FIG. 1 is a top plan view of a temporary traffic marker embodying the principles of the present invention.
Figure 2:
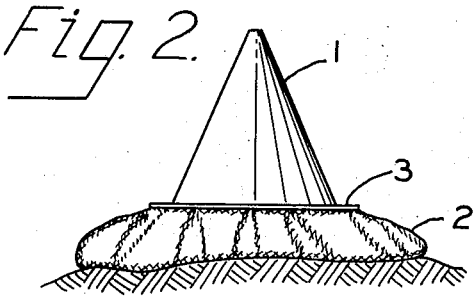
FIG. 2 is a front elevation of the marker illustrated in FIG. 1.

Referring first to FIG. 1, the traffic marker comprises an indicator 1 and a base 2 by which the indicator is supported in upright position. The indicator 1 preferably is in the form of an open bottomed conical shell having an outwardly flaring peripheral basal flange 3. The conical shell is made light in weight. The side walls and flange 3 are sufficiently stiff to hold their shapes and be self-supporting when the shell is supported in its indicating position, but can be deformed readily. The indicator may be of thin walled, resilient plastic material which can be deformable by a resilient change in shape or contour or may be of frangible material so as to be deformable by fragmentation upon impact. The indicator may be coated with highly reflective, light intensifying paint, or it may be transluscent, or both translucent and reflective, so as to be capable of use as an illuminated flasher or marker. In the latter case, in order to eliminate any substantial opposition to an oncoming vehicle wheel, or to any portion of a vehicle which could be damaged upon striking at high speed a mass having substantial static inertial resistance, the lighting may be effected by means of a pair of small penlight batteries B operating a small flashlight type bulb F, and equipped with the usual thermoflash button, not shown. The entire lighting structure may be suitably connected to the inside of the wall of the shell or indicator 1.

The base 2 is a closed liquid container, preferably in the form of a bag of imperforate, impervious, flexible or limp, tough sheet material, offering substantially no resistance to collapse. A large number of such materials are available on the market and may be composed of plastic alone, fabric reinforced plastic, or fabric impregnated with plastic. The bag normally may be of conventional full open-top type, and gathered at the top to provide a throat or neck in which a plug 4 is installed. The plug 4 has a filling passage therein closed by a suitable stopper 5.

The indicator 1 is secured in position such that its flange 3 can rest on the upwardly facing or top surface of the bag when the bag is in operating position.

The indicator may be connected to the bag in any suitable manner, but preferably is elastically connected.

In the form illustrated, the connection is by means of ties 6 of elastic material so that the indicator can be lifted up relative to the top surface of the bag so as to expose the plug 4 for filling or draining, and so that extraneous impact forces imposed on the indicator, if it is struck by a vehicle, are relieved. The resilient ties 6 return the indicator 1 to its normal position with its flange 3 resting on the top wall of the bag. The base 2 is of such size, and so located relative to the bottom of the indicator 1 that, when the base is charged with the proper amount of liquid ballast and is resting on a supporting surface, the portion of the wall of the base then forming its top wall, indicated at 7, extends outwardly beyond the outer periphery of the flange and provides a relatively wide supporting surface for the indicator 1. The size of the bag or base 2 is such that when it is filled from about one fourth to two thirds of its capacity and is resting on a supporting surface, both the base bottom, indicated at 8, and its top wall 7, extend outwardly beyond the flange 3, and the portion forming the side wall is generally upright, but curvilinear and outwardly convex. Thus the base, as a whole, presents a very low profile to the oncoming wheel of a vehicle. In this charged condition, the base maintains the indicator 1 in upright position.

Because the top wall 7 and bottom 8 extend outwardly from the flange 3 about the entire periphery of the base of the indicator 1, stability is provided against tipping in any and all directions.

The base 2 is of sufficiently limp or flexible material so that when charged with a normal charge of liquid ballast, its bottom wall can conform to irregularities in the contour and slope of a supporting surface and can cling thereto while supporting the indicator 1 in its normal upright position. As mentioned, the charge of liquid in the base is usually a minor proportion of its total capacity. In operating position, with the bottom wall conforming to the contour of the supporting surface, the outward pressure of the liquid ballast tensions the upper wall portion somewhat radialy outwardly in all directions so that the wall 7 assumes a generally horizontal position under sufficient tension to support the indicator by the flange 3 resting on the wall 7. The part of the bag or base 2 around the neck may project upwardly into the hollow base of the conical indicator 1, if desired.

Figure 3:
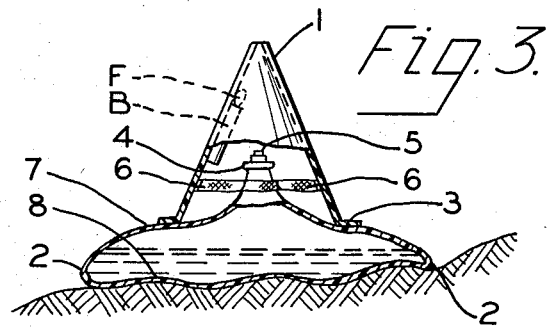
FIG. 3 is a vertical sectional view of the marker and is taken on the line 3—3 in FIG. 1.
Figure 4:
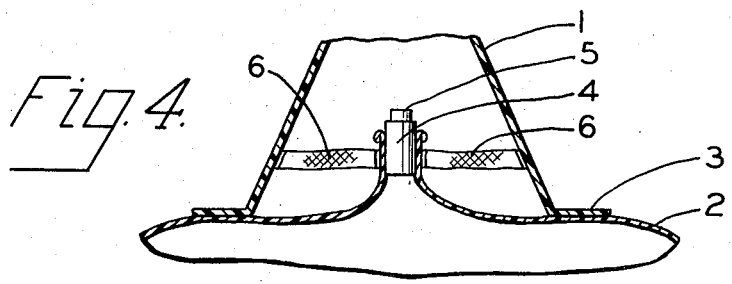
FIG. 4 is an enlarged fragmentary view of a portion of the structure illustrated in FIG. 3, illustrating certain details of construction.

Thus, if the marker is placed on an irregular or sloping surface, the bottom will conform thereto, as illustrated in FIG. 3, supporting the indicator 1 generally upright. The base 2, in this condition, presents an extremely low profile such that if it is struck by the wheel of an oncoming vehicle, it offers substantially no initial frontal resistance to the wheel. Instead, the wheel can ride thereover. Since the base or bag is only partially filled with liquid, it has adequate capacity to adjust to the surge and accommodate the liquid displaced from any portion by a vehicle wheel passing thereover. When the base is thus collapsed, the upper wall 7 is juxtaposed against the bottom wall 8 and the juxtaposed walls conform to the contour of the supporting surface, permitting the wheel to pass over the base 2. Upon passage of the wheel beyond the base 2, the liquid ballast flows back and restores the base to its original condition. The water displaced by the wheel is retained without spilling since the base is sealed. Therefore it can rise up into that portion of the base which is within the cavity in the conical indicator 1 of the marker and can temporarily reshape the bag to relieve the impact forces. Because the marker is elastically attached to the bag, a severe blow striking the indicator only deflects the indicator temporarily, and relieves the shock on the base and the indicator, after which both are restored by the elastic attaching means and the base to their original positions.

The amount of liquid used within the desirable limits depends upon the size of the indicator 1 and the weight required for sustaining it. Its upper limit of filling is such that the bag can accommodate the displaced liquid without bursting.

The liquid ballast used ordinarily may be water. At the times when the temperature is apt to fall below freezing, an antifreeze solution may be used, the most economical being salt water or brine.

Figure 5:
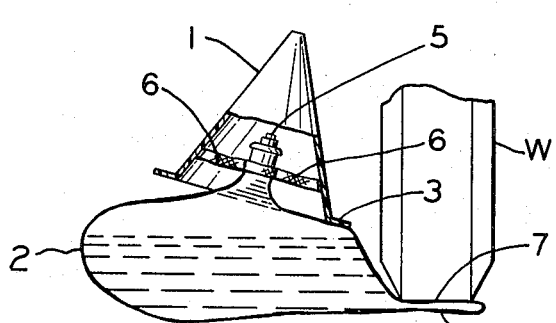
FIG. 5 is a diagrammatic front elevation of the marker showing the relation of its base to the tire of an automobile wheel when the marker is being run over by the tire.

As illustrated in FIG. 5, the condition of the base 2 and indicator 1, when under the pressure imposed by the wheel W of a travelling vehicle running over the base 2 outside of the cone or indicator 1, is illustrated. Generally, this causes the water to surge upwardly, tending to form the base temporarily into somewhat globular shape, with a flattened bottom, and to lift the indicator 1, as illustrated in FIG. 5. Upon removal of the wheel W, the base is restored by the liquid to its original condition. This self-restoring feature and the fact that the marker retains its liquid ballast when the base is run over, assures that the marker retains its weight and will remain in the selected indicating position after being run over. Further, due to the low profile, it is much less subject to being thrown upwardly against and into entangling relation to portions of the vehicle body.

Figure 6:
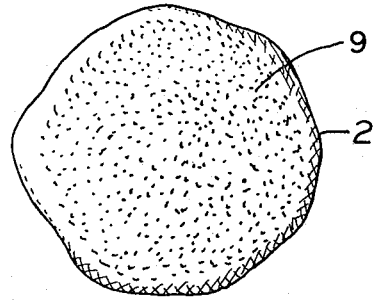
FIG. 6 is a bottom plan view of the marker illustrated in FIG. 1, illustrating an alternative in which the bottom of the base is coated with pressure sensitive adhesive.

Referring to FIG. 6, a modification of the structure illustrated in FIGS. 1 through 5 is shown, the modification residing in the fact that the bottom of the bag is covered with a film 9 of pressure sensitive adhesive so that the bag can be more firmly held in place, especially upon a very smooth surface. The marker has utility not only as a traffic marker, but for marking playfields, gymnasium floors, and the like where a rigid marker of any type would be hazardous to the players.

Figure 7:
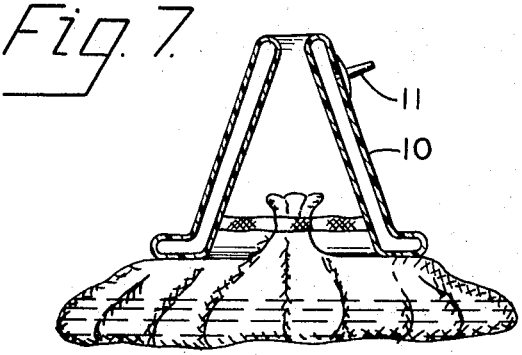
FIG. 7 is a vertical sectional view, similar to FIG. 3, illustrating a modification of the invention wherein the indicator is an inflatable double wall cone.

Referring next to FIG. 7, another modification is illustrated in which a marker 10, instead of being in the form of a thin-walled conical shell, is in the form of a double wall conical shell 10 which is inflatable through a suitable inflating valve 11. Preferably, when so used, the shell 10 is of sheet material such that the shell is self-sustaining only when inflated, and collapses when uninflated.

Figure 8:
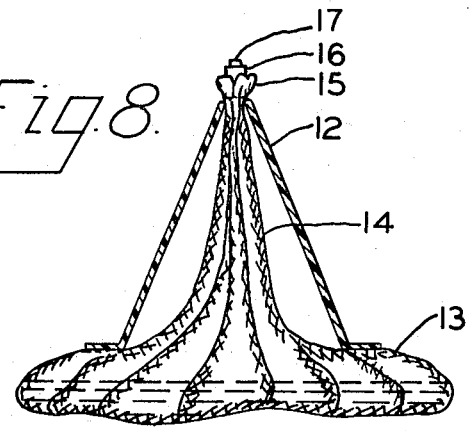
FIG. 8 is a cross sectional view, similar to FIG. 3, illustrating a modification of the invention.

Referring to FIG. 8, a modification is illustrated in which the indicator is a hollow conical shell 12, such as described in connection with FIG. 1. However, the shell 12 is open at the top. The base comprises a bag 13, such as the base 2 heretofore described. It has sufficient material so that its upper portion can be gathered into an elongated neck portion 14, the uppermost end of which, as indicated at 15, is drawn outwardly through the top of the shell 12 and secured thereto. The uppermost end or mouth is fitted with a filling plug 16 having a filling passage closed by a stopper 17. Thus, if the base 13 is run over by a vehicle wheel, the water can surge upwardly into the neck portion 14 in the interior of the cone and the neck portion can open up to fit the interior of the cone to an extent such that the indicator wall buttresses and reinforces the base laterally.

Figure 9:
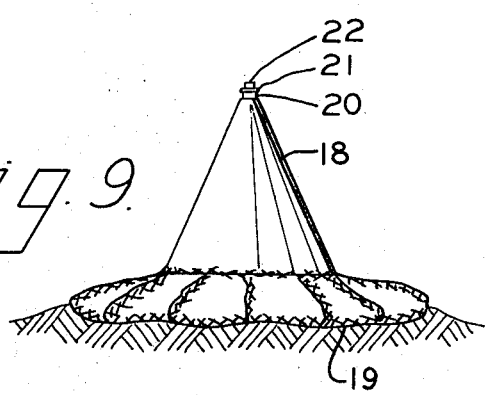
FIG. 9 is a front elevation of another modification.
Figure 10:
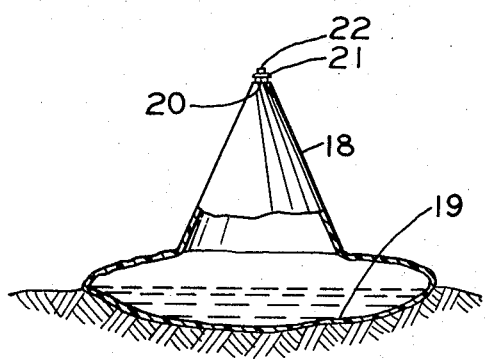
FIG. 10 is a front elevation of the structure illustrated in FIG. 9, part thereof being shown in section for clearness in illustration, and showing the cooperation of the bottom of the base with a chuckhole in a pavement.
Figure 11:
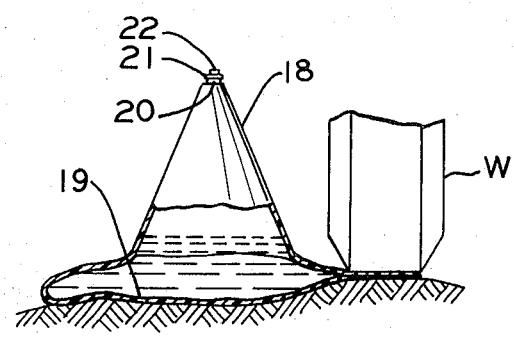
FIG. 11 is a front elevation, similar to FIG. 10, illustrating the collapse of a portion of the base when the base is run over by a vehicle wheel.

Referring next to FIGS. 9 through 11, another modification is illustrated in which a conical shell indicator 18, similar to the indicator 1 heretofore described, is employed. In this connection, instead of using a separate bag as a base, the bottom part of the indicator 18 itself provides a portion of the liquid holding base or container, and the portion of the base formed by the shell provides a surge tank for the displaced water receiving surge portion. In this case, a bottom wall 19 of flexible, impervious, and imperforate material is connected to the bottom of the indicator 18, preferably by cementing its upper outer periphery to the interior of the indicator 18. Thus, the base is in the form of a bag having a wide open top, the bottom wall of which will conform to the contour of the supporting surfaces heretofore described in connection with FIG. 1. The base and indicator provide a sealed base so that the liquid ballast cannot be spilled. The resultant container, however, includes part of the interior of the indicator itself, and so the flexible bag portion can be completely filled. This container or base, as a whole, therefore, is only partially filled with liquid. All of the liquid in the bag portion can readily enter into and be accommodated in, the indicator 18, when displaced by the wheel of a vehicle. The indicator 18 has at its top a plug 20 with a filling passage 21 closed by a suitable stopper 22.

Thus, in all forms of the invention the marker is held in substantially upright position and ballasted sufficiently to retain the position in which placed under normal conditions. Further, it offers no hazard to traffic, but instead is readily deformed to permit relatively free passage of a wheel of a vehicle thereover without necessitating the rise of the wheel from the contoured supporting surface and without presenting a structure which is rigid enough to cause substantial damage to a vehicle if thrown thereagainst by a wheel.

Having thus described my invention, I claim:

1. A traffic marking device comprising;
    a relatively light weight indicator;
    a base connected to the indicator for supporting the indicator in upright position;
    said indicator having low resistance to lateral impacts when supported in upright position by said base;
    said base including a container of which at least the lower portion is of imperforate, impervious, flexible, relatively limp sheet material which has such low resistance to flexure that the container can be supported on a generally horizontal supporting surface of irregular contour by engagement of a portion of the wall of said lower portion of the container with the supporting surface, and said portion of the wall so engaged can be conformed to the irregularities of the supporting surface by a predetermined charge of liquid in said lower portion of the container much less than would be required to fill said container;

said container being of such a size, and having a liquid capacity so related to the size, shape, and weight of the indicator that, if the container is provided with said predetermined charge and said wall portion is conformed thereby to said supporting surface, the container will hold the indicator upright, and the said conformed portion of the wall and the overlying portion of the wall adjacent thereto will provide a peripheral container portion which extends materially outwardly from, and in surrounding relation to, the outer periphery of the bottom of the indicator and which will present to an aligned wheel of a vehicle approaching along said surface, a very low profile substantially free from frontal resistance to initial engagement thereof by the wheel;

said container having an upper hollow portion with free access thereinto from the lower peripheral portion so that it is capable of receiving freely any liquid which could be expelled from the peripheral portion as a result of such initial engagement and as a result of collapse of the part of the peripheral container portion over which the wheel passes; and said upper portion of the container having a capacity so related to the capacity of the lower portion of the container that the lower portion is capable of containing all of said charge while the upper portion is empty, and the upper portion is capable of receiving and accommodating temporarily all of the liquid which could be so expelled from the lower portion and so that the expelled liquid could return from said peripheral portion whereby said aligned peripheral portion of the container is rendered substantially free from resistance to collapse by a wheel passing thereover.

2. The structure according to claim 1 characterized in that the interior of the container is fully open and substantially unobstructed across at least most of its overall width in all upright diametral planes when the container is in indicator supporting condition.

3. The structure according to claim 2 wherein the portion of the wall of the container, beginning contiguous to the first mentioned wall portion which engages the supporting surface, extends inwardly in overlying spaced relation to said first mentioned wall portion, and is a continuation of the sheet material thereof.

4. The structure according to claim 1 wherein self-restoring means connect the indicator of the container for limited movement of the indicator relative to the container upon said collapse of said portion of the container and are operative to return the indicator to its original position when the collapsing force is removed.

5. The structure according to claim 1 wherein said indicator is hollow at least at its lower portion and has an open bottom, and the indicator is connected to the container so that said displaced liquid can surge upwardly into the interior of the container.

6. The structure according to claim 1 wherein said container is in the form of a normally open top bag and the upper marginal portion of its side wall is in gathered condition to close or restrict the opening into the bag while part of the side wall between the gather and bottom of the bag provides a top wall on which the indicator is supported.

7. The structure according to claim 6 wherein the indicator is hollow and has an open base, and the gathered portion of the side wall of the bag is aligned with the open base.

8. The structure according to claim 1 wherein the parts are so proportioned as to be operative with a charge which is a minor proportion of the total capacity of the container.

9. The structure according to claim 6 wherein said portion of the side wall of the bag between the gathered margin and the portion of the side wall near the bottom of the bag is normally loose and collapsed and is readily expandible for accommodating liquid expelled from the bottom portion of the bag.

10. A traffic marking device according to claim 1 wherein the lower portion of the indicator is hollow and forms part of the upper hollow portion of the container.

11. A traffic marking device according to claim 1 wherein the indicator is an open bottom shell and the base is a bag which normally has an open top; and
the upper portion of the bag is in the form of a gathered neck extending a substantial distance upwardly into the interior of the shell.

12. The structure according to claim 1 wherein the container is a bag of which the wall portions are of said imperforate, impervious, flexible, relatively limp sheet material, and the bag has a single cavity which extends uninterruptedly entirely across its interior from each peripheral wall portion to the diametrically opposite peripheral wall portion.

* * * * *

UNITED STATES PATENT OFFICE
CERTIFICATE OF CORRECTION

Patent No. 3,795,220          Dated March 5, 1974

Inventor(s) Robert W. Hengesbach

It is certified that error appears in the above-identified patent and that said Letters Patent are hereby corrected as shown below:

Claim 4, line 2, for "of" read --to--.

Signed and sealed this 20th day of August 1974.

(SEAL)
Attest:

McCOY M. GIBSON, JR.          C. MARSHALL DANN
Attesting Officer             Commissioner of Patents